(12) United States Patent
Rog

(10) Patent No.: US 9,903,222 B2
(45) Date of Patent: Feb. 27, 2018

(54) GAS TURBINE ENGINE EXHAUST DRAIN

(71) Applicant: United Technologies Corporation, Hartford, CT (US)

(72) Inventor: Daniel T. Rog, South Windsor, CT (US)

(73) Assignee: United Technologies Corporation, Farmington, CT (US)

(*) Notice: Subject to any disclaimer, the term of this patent is extended or adjusted under 35 U.S.C. 154(b) by 377 days.

(21) Appl. No.: 14/771,253

(22) PCT Filed: Feb. 21, 2014

(86) PCT No.: PCT/US2014/017537
§ 371 (c)(1),
(2) Date: Aug. 28, 2015

(87) PCT Pub. No.: WO2014/189573
PCT Pub. Date: Nov. 27, 2014

(65) Prior Publication Data
US 2016/0017748 A1    Jan. 21, 2016

Related U.S. Application Data

(60) Provisional application No. 61/774,812, filed on Mar. 8, 2013.

(51) Int. Cl.
F01D 25/00    (2006.01)
F01D 25/30    (2006.01)
(Continued)

(52) U.S. Cl.
CPC .......... F01D 25/002 (2013.01); F01D 25/30 (2013.01); F01D 25/32 (2013.01); F02K 1/78 (2013.01);
(Continued)

(58) Field of Classification Search
CPC ........ F01D 25/002; F01D 25/30; F01D 25/32; F05D 2220/32; F02K 1/78; F04F 5/14; F01N 2470/30
(Continued)

(56) References Cited

U.S. PATENT DOCUMENTS 3,977,811 A    8/1976 Kuintzle, Jr.
4,690,245 A    9/1987 Gregorich et al.
(Continued)

OTHER PUBLICATIONS

International Preliminary Report on Patentability for International Application No. PCT/US2014/017537 dated Sep. 17, 2015.
(Continued)

Primary Examiner — Mark Laurenzi
Assistant Examiner — Dapinder Singh
(74) Attorney, Agent, or Firm — Carlson, Gaskey & Olds, P.C.

(57) ABSTRACT

An exhaust system of a gas turbine engine includes an exhaust duct, and a venturi drainage device that drains fluid collected in the exhaust duct. The venturi drainage device includes an inlet in fluid communication with the exhaust duct. The venturi drainage device operates in an entrain mode when a flight condition occurs during operating of the gas turbine engine and operates in a drain mode when the gas turbine engine is not operating to drain the fluid from the exhaust duct.

16 Claims, 3 Drawing Sheets

(51) Int. Cl.
  *F02K 1/78* (2006.01)
  *F04F 5/14* (2006.01)
  *F01D 25/32* (2006.01)

(52) U.S. Cl.
  CPC ............ *F04F 5/14* (2013.01); *F01N 2470/30* (2013.01); *F05D 2220/32* (2013.01); *F05D 2260/601* (2013.01); *F05D 2260/602* (2013.01)

(58) Field of Classification Search
  USPC .................................................... 415/211.2
  See application file for complete search history.

(56) References Cited

U.S. PATENT DOCUMENTS

| | | | |
|---|---|---|---|
| 4,972,672 A | 11/1990 | Sanderson et al. | |
| 6,301,877 B1 | 10/2001 | Liang et al. | |
| 6,406,344 B1* | 6/2002 | Bland | B63H 20/285 440/88 J |
| 6,663,451 B1 | 12/2003 | Walczak | |
| 7,074,097 B1* | 7/2006 | Seymour, II | B63H 21/34 440/89 R |
| 7,393,253 B1* | 7/2008 | Clifford | B63H 20/285 440/88 C |
| 8,051,637 B2 | 11/2011 | Labrador | |
| 8,322,126 B2 | 12/2012 | Bies et al. | |
| 2007/0119433 A1 | 5/2007 | Popik et al. | |
| 2011/0000220 A1 | 1/2011 | Hibshman, II | |
| 2011/0146223 A1 | 6/2011 | Thies | |

OTHER PUBLICATIONS

International Search Report and Written Opinion for International Application No. PCT/US2014/017537 dated Dec. 10, 2014.

\* cited by examiner

GAS TURBINE ENGINE EXHAUST DRAIN

BACKGROUND OF THE INVENTION

Water or other fluids can collect in a propulsion system of an aircraft with a turbofan or a turbojet propulsion system. A propulsion system includes an aircraft engine, an inlet air duct, and an exhaust duct. Fluid that pools in the exhaust duct can cause numerous problems for an aircraft propulsion system, including corrosion, material incompatibility, mold and/or fungus growth, frozen water expansion and sensor malfunction. Some propulsion systems are more likely to pool fluids than others due to geometry.

SUMMARY OF THE INVENTION

An exhaust system of a gas turbine engine according to an exemplary embodiment of this disclosure, among other possible things includes an exhaust duct, and a venturi drainage device that drains fluid collected in the exhaust duct. The venturi drainage device includes an inlet in fluid communication with the exhaust duct. The venturi drainage device operates in an entrain mode when a flight condition occurs during operating of the gas turbine engine and operates in a drain mode when the gas turbine engine is not operating to drain the fluid from the exhaust duct.

In a further embodiment of any of the foregoing exhaust systems, the exhaust duct terminates in an upwardly facing opening.

In a further embodiment of any of the foregoing exhaust systems, the exhaust duct has a low spot, and the inlet of the venturi drainage device is located generally in the low spot of the exhaust duct.

In a further embodiment of any of the foregoing exhaust systems, the venturi drainage device includes a first portion and a second portion. The first portion is spaced apart from the second portion to define a gap therebetween that defines a passage.

In a further embodiment of any of the foregoing exhaust systems, the first portion includes the inlet and a nozzle of reduced diameter. The second portion includes an ejector diffusor and an outlet in fluid communication with the exhaust duct. The gap is located between the nozzle of the first portion and the ejector diffusor of the second portion.

In a further embodiment of any of the foregoing exhaust systems, the ejector diffusor includes a diverging section of reducing diameter, a converging section of increasing diameter, and a reduced diameter section located between the diverging section and the converging section.

In a further embodiment of any of the foregoing exhaust systems, during the entrain mode, an exhaust flow is drawn through the exhaust duct and through the inlet of the ejector, and a suction flow of ambient air is entrained through the passage and into the ejector diffusor by a venturi effect to combine with the exhaust flow to create a mixed flow that flows through the outlet of the second portion.

In a further embodiment of any of the foregoing exhaust systems, the ejector diffusor creates a venturi effect that converts pressure energy of the exhaust flow to velocity energy to create a low pressure zone that draws the suction flow into the second portion of the venturi drainage device to combine with the exhaust flow to create the mixed flow, and the mixed flow is expanded when flowing through the reduced diameter section to convert the velocity energy to the pressure energy.

In a further embodiment of any of the foregoing exhaust systems, during the drain mode, the fluid drains through the passage.

A exhaust system of a gas turbine engine according to an exemplary embodiment of this disclosure, among other possible things includes an exhaust duct, and a venturi drainage device that drains fluid collected in the exhaust duct. The venturi drainage device includes a first portion including an inlet in fluid communication with the exhaust duct. A second portion includes an ejector diffusor having an outlet in fluid communication with the exhaust duct. The first portion is spaced apart from the second portion to define a gap therebetween that define a passage. The venturi drainage device operates in an entrain mode when a flight condition occurs during operating of the gas turbine engine, and during the entrain mode, an exhaust flow is drawn through the exhaust duct and through the inlet of the venturi drainage device. A suction flow of ambient air is entrained through a gap and into an ejector diffusor by an venturi effect to combine with the exhaust flow to create a mixed flow that flows through the outlet of the ejector diffusor of the venturi drainage device. The venturi drainage device operates in a drain mode when the gas turbine engine is not operating to drain the fluid from the exhaust duct.

In a further embodiment of any of the foregoing exhaust systems, the exhaust duct terminates in an upwardly facing opening.

In a further embodiment of any of the foregoing exhaust systems, the exhaust duct has a low spot, and the inlet of the venturi drainage device is located generally in the low spot of the exhaust duct.

In a further embodiment of any of the foregoing exhaust systems, the first portion includes the inlet and a nozzle of reduced diameter, the second portion includes an ejector diffusor and the outlet in fluid communication with the exhaust duct, and the gap is located between the nozzle of the first portion and the ejector diffusor of the second portion.

In a further embodiment of any of the foregoing exhaust systems, during the entrain mode, an exhaust flow is drawn through the exhaust duct and through the inlet of the ejector, and a suction flow of ambient air is entrained through the passage and into the ejector diffusor by a venturi effect to combine with the exhaust flow to create a mixed flow that flows through the outlet of the second portion.

In a further embodiment of any of the foregoing exhaust systems, the ejector diffusor creates a venturi effect that converts pressure energy of the exhaust flow to velocity energy to create a low pressure zone that draws the suction flow into the second portion of the venturi drainage device to combine with the exhaust flow to create the mixed flow, and the mixed flow is expanded when flowing through the reduced diameter section to convert the velocity energy to the pressure energy.

In a further embodiment of any of the foregoing exhaust systems, during the drain mode, the fluid drains through the passage.

These and other features of the present invention can be best understood from the following specification and drawings, the following of which is a brief description.

DETAILED DESCRIPTION OF THE PREFERRED EMBODIMENTS

Figure 1:
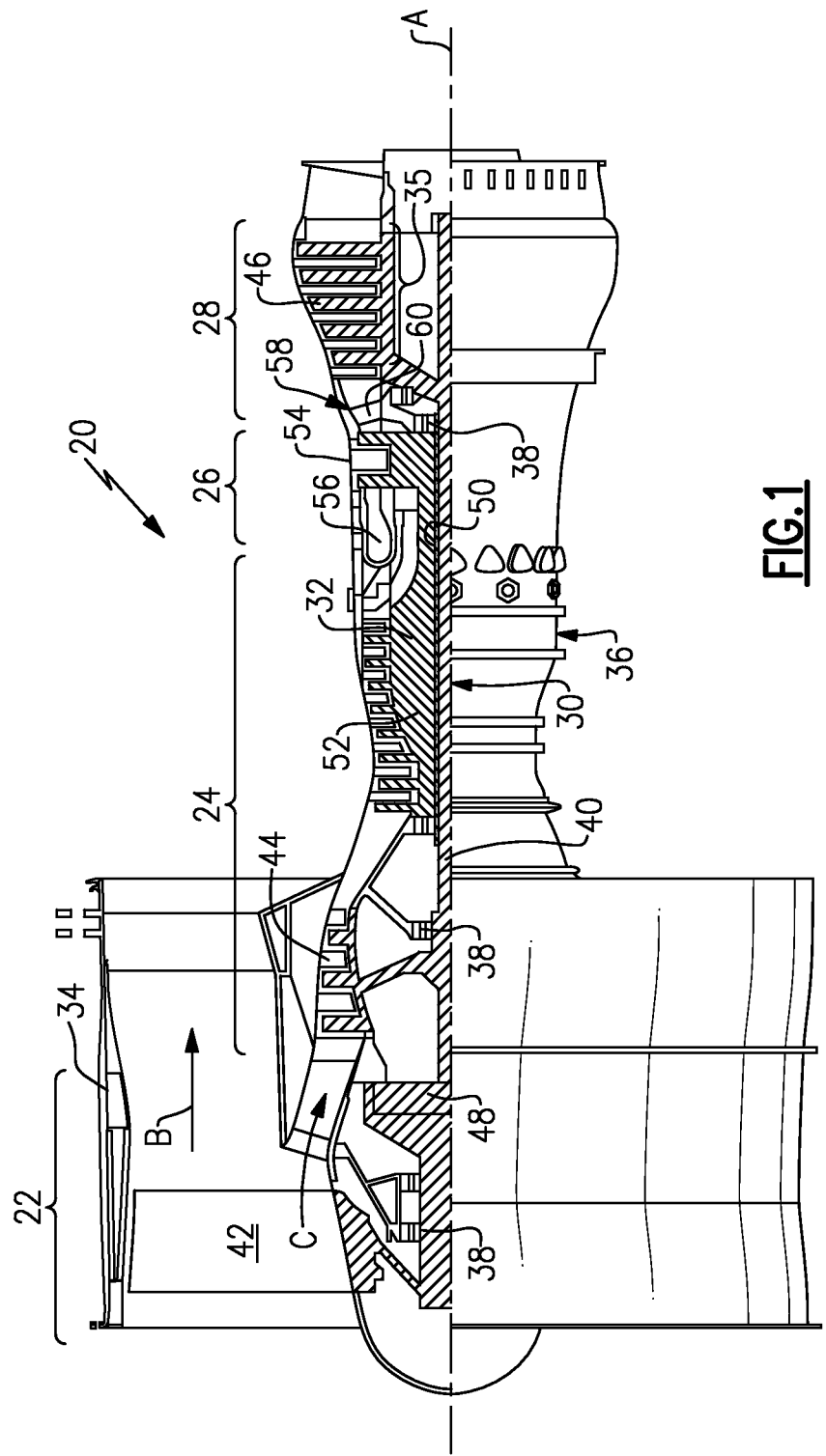
FIG. 1 illustrates a schematic view of an embodiment of a gas turbine engine.

FIG. 1 schematically illustrates an example gas turbine engine 20 that includes a fan section 22, a compressor section 24, a combustor section 26 and a turbine section 28. Alternative engines might include an augmenter section (not shown) among other systems or features.

The fan section 22 includes a fan 42 that drives air along a bypass flow path B in a bypass duct defined within a nacelle 34, while the compressor section 24 draws air in along a core flow path C where air is compressed and communicated to the combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a geared turbofan gas turbine engine, it should be understood that the concepts described herein are not limited to use with geared turbofans as the teachings may be applied to other types of traditional turbine engines. For example, the gas turbine engine 20 can have a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example gas turbine engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A which is collinear with their longitudinal axes.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

The air in the core flow path C is compressed by the low pressure compressor 44 then by the high pressure compressor 52, mixed with fuel and ignited in the combustor 56 to produce high speed exhaust gases that are then expanded through the high pressure turbine 54 and low pressure turbine 46. The mid-turbine frame 58 includes vanes 60, which are in the core flow path C and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the air in the bypass flow path B due to the high bypass ratio. The fan section 22 of the gas turbine engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment, the low fan pressure ratio is less than about 1.45. "Low corrected fan tip speed" is the actual fan tip speed in ft/sec divided by an industry standard temperature correction of $[(\text{Tram}° \text{R})/(518.7° \text{R})]^{0.5}$. The "Low corrected fan tip speed" as disclosed herein according to one non-limiting embodiment is less than about 1150 ft/second.

The example gas turbine engine 20 includes the fan 42 that comprises in one non-limiting embodiment less than about 26 fan blades. In another non-limiting embodiment, the fan section 22 includes less than about 20 fan blades. Moreover, in one disclosed embodiment the low pressure turbine 46 includes no more than about 6 turbine rotors schematically indicated at 35. In another non-limiting example embodiment the low pressure turbine 46 includes about 3 turbine rotors. A ratio between the number of fan blades and the number of low pressure turbine rotors is between about 3.3 and about 8.6. The example low pressure turbine 46 provides the driving power to rotate the fan section 22 and therefore the relationship between the number of turbine rotors 35 in the low pressure turbine 46 and the number of fan blades in the fan section 22 disclose an example gas turbine engine 20 with increased power transfer efficiency.

Figure 2:
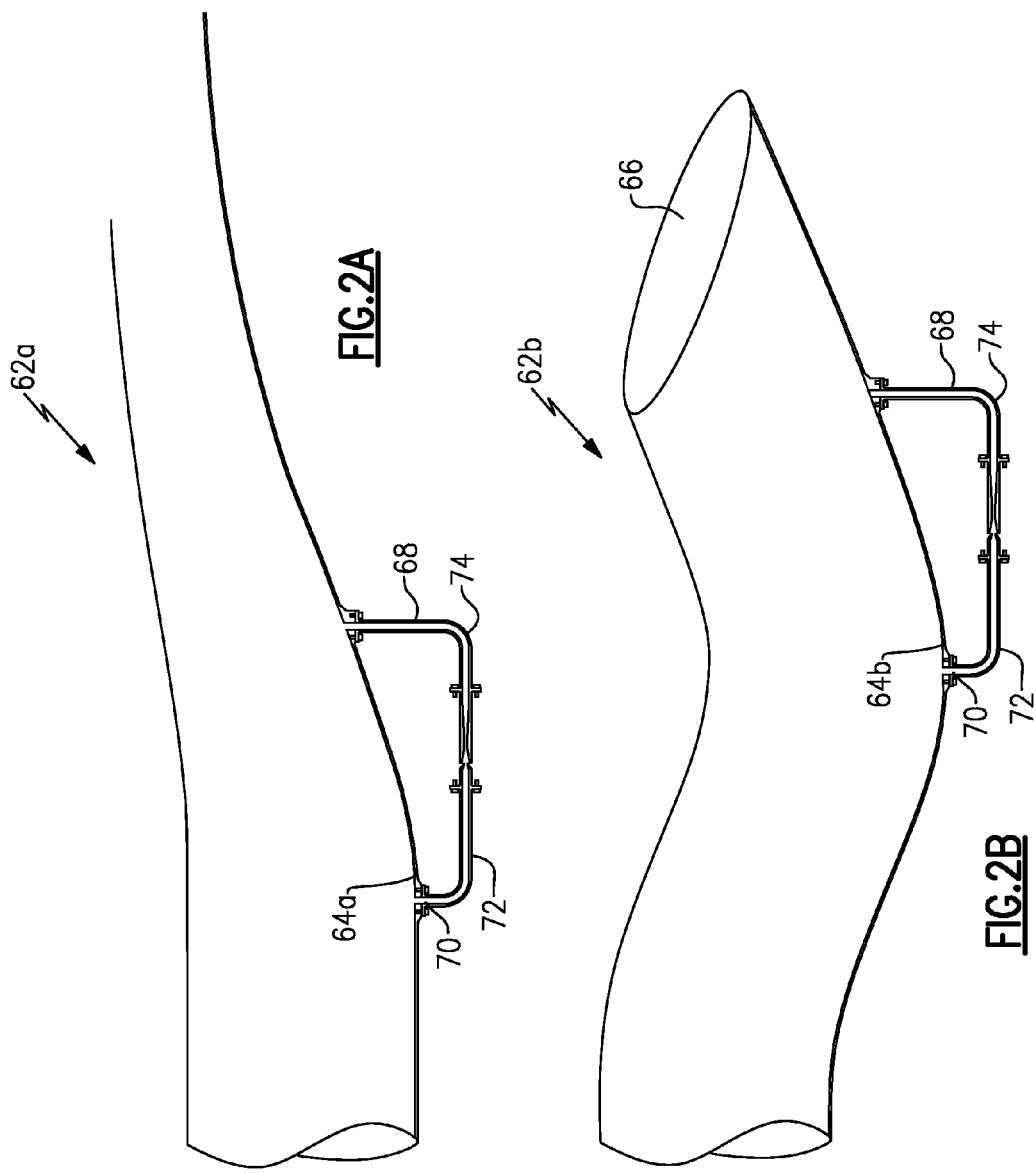
FIG. 2A illustrates an exhaust duct including a low spot.
FIG. 2B illustrates an exhaust duct including an upwardly extending opening.

FIGS. 2a and 2b illustrate an exhaust duct 62a and 62b, respectively, of an exhaust system of an aircraft engine system. The exhaust duct 62a includes a low spot 64a. The exhaust duct 62b includes a low spot 64b and terminates with an upward facing opening 66. The aircraft engine exhaust system can be cylindrical or non-cylindrical.

Exhaust flows through aerospace plumbing and to the exhaust duct 62 from the low pressure turbine 46. A venturi drainage device 68 (such an ejector, an injector, an educator-jet exhaust duct or a thermocompressor, etc.) drains any pooled fluid 94 or moisture that collects in the exhaust duct 62a or 62b. Fluid can collect in a low spots 64a or 64b of the exhaust duct 62a or 62b, respectively, and the venturi drainage device 68 drains the fluid 94.

In one example, an inlet 70 of the venturi drainage device 68 (described below) is located generally in the low spots 64a or 64b of the exhaust duct 62a or 62b, respectively. The venturi drainage device 68 can be located in an augmentor, after the augmentor, in a turbine exhaust case, in a nacelle or in a bypass stream. In one example, the venturi drainage device 68 is located generally in a lower section of the exhaust ducts 62a or 62b. In another example, the venturi drainage device 68 is located at a center of the exhaust ducts 62a or 62b.

Figure 3:
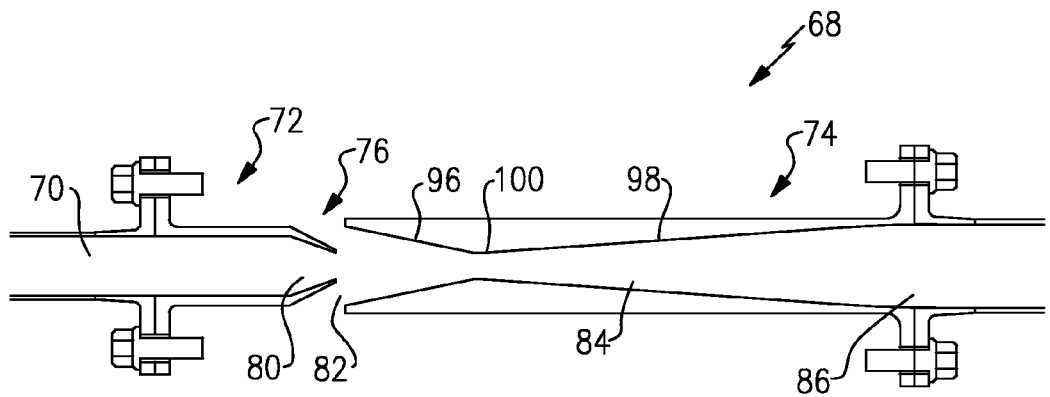
FIG. 3 illustrates a venturi drainage device employed with the exhaust duct.

FIG. 3 illustrates the venturi drainage device 68 employed with an exhaust system of the gas turbine engine 20. The venturi drainage device 68 includes a first portion 72 spaced apart from a second portion 74 to define a gap 76 therebetween.

The first portion 72 includes the inlet 70 in fluid communication with the exhaust duct 62 and a nozzle 80 of reduced diameter. In one example, the inlet 70 is located at the low spot 64a or 64b of the exhaust duct 62a or 62b, respectively. The gap 76 defines a passage 82.

The second portion 74 includes an ejector diffuser 84 and an outlet 86 in fluid communication with the exhaust ducts 62a or 62b. The ejector diffuser 84 includes a diverging section 96 of reducing diameter, a converging section 98 of increasing diameter, and a reduced diameter section 100 of the smallest diameter located between the diverging section 96 and the converging section 98. The gap 76 is located between the nozzle 80 and the diverging section 96 of the ejector diffusor 84.

Figure 4:
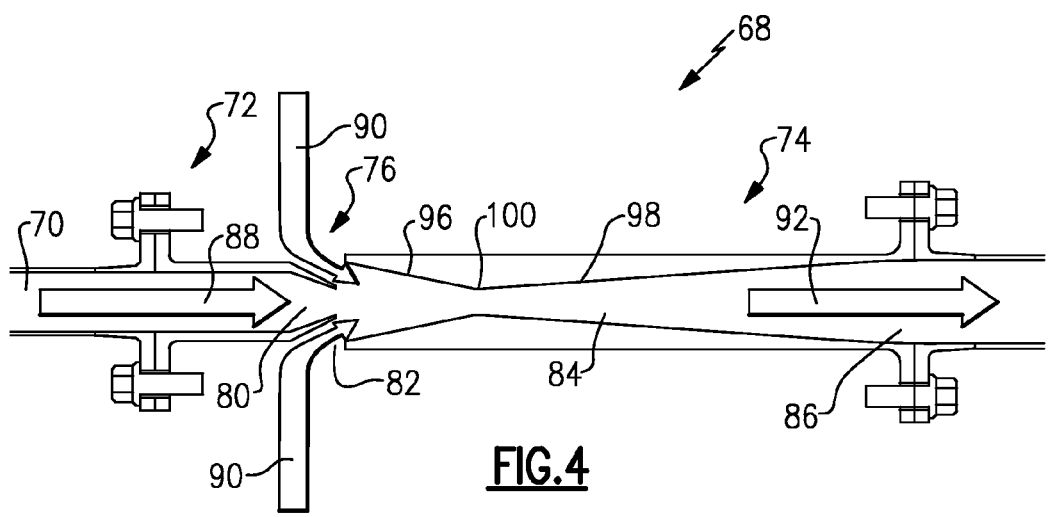
FIG. 4 illustrates the venturi drainage device during an entrain mode.

FIG. 4 illustrates the venturi drainage device 68 during operation of the gas turbine engine 20 during an entrain mode. The venture drainage device 68 does not need to function constantly as an ejector during operation of the gas turbine engine 20 throughout all operating conditions, but generally when predominant flight conditions of interest are occurring. An example flight condition of interest is cruise.

An exhaust flow 88 (or a motive flow) is drawn from the exhaust duct 62 and ducted into the venturi drainage device 68. The exhaust flow 88 enters the venturi drainage device 68 through the inlet 70 of the first portion 72.

The ejector diffusor 84 of the venturi drainage device 68 generally creates a venturi effect that converts pressure energy of the exhaust flow 88 (a motive fluid) to velocity energy to create a low pressure zone. The low pressure zone creates a vacuum that draws in and entrains a suction flow 90 entrained from ambient air (for example, nacelle air or engine bay air) through the passage 82 between the first portion 72 and the second portion 74. The exhaust flow 88 and the suction flow 90 combine to form the mixed flow 92.

After the mixed flow 92 passes through the reduced diameter section 100, the mixed flow 92 expands as the velocity energy is converted to pressure energy. The mixed flow passes through the ejector diffusor 84 and is discharged through the outlet 86 and is returned to the exhaust duct 62a or 62b.

Figure 5:
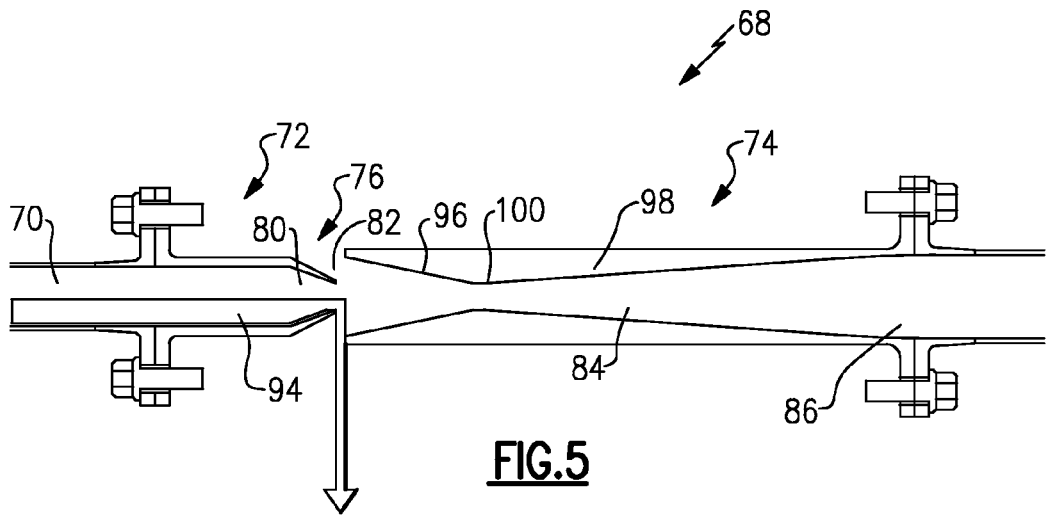
FIG. 5 illustrates the venturi drainage device during a drain mode.

FIG. 5 illustrates the venturi drainage device 68 during a drain mode when the gas turbine engine 20 is not operating. During the drain mode, a fluid 94 drains through the exhaust duct 62 and to the inlet 70 of the venturi drainage device 68. As the venturi effect is not occurring because the gas turbine engine 20 is not operating, the fluid 94 flows through the first section 72 and drains though the passage 82 from the venturi drainage device 68.

The venturi drainage device 68 allows the fluid 94 to drain from the exhaust duct 62 without any interaction, moving parts, and/or indication of functionality. No action is required to change operation of the venturi drainage device 68 between the drain mode and the entrain mode.

The diameter of the reduced section 10 can be modified based on where the venturi drainage device 68 is located in the exhaust system to provide customization.

Although a gas turbine engine 20 with geared architecture 48 is described, the venturi drainage device 68 can be employed in a gas turbine engine without geared architecture.

The foregoing description is only exemplary of the principles of the invention. Many modifications and variations are possible in light of the above teachings. It is, therefore, to be understood that within the scope of the appended claims, the invention may be practiced otherwise than using the example embodiments which have been specifically described. For that reason the following claims should be studied to determine the true scope and content of this invention.

What is claimed is:

1. An exhaust system of a gas turbine engine comprising:
   an exhaust duct;
   a venturi drainage device that drains fluid collected in the exhaust duct, wherein the venturi drainage device includes an inlet in fluid communication with the exhaust duct, and the venturi drainage device operates in an entrain mode when a flight condition occurs during operating of the gas turbine engine and operates in a drain mode when the gas turbine engine is not operating to drain the fluid from the exhaust duct.

2. The exhaust system as recited in claim 1 wherein the exhaust duct terminates in an upwardly facing opening.

3. The exhaust system as recited in claim 1 wherein the exhaust duct has a low spot, and the inlet of the venturi drainage device is located generally in the low spot of the exhaust duct.

4. The exhaust system as recited in claim 1 wherein the venturi drainage device includes a first portion and a second portion, wherein the first portion is spaced apart from the second portion to define a gap therebetween that defines a passage.

5. The exhaust system as recited in claim 4 wherein the first portion includes the inlet and a nozzle of reduced diameter, the second portion includes an ejector diffusor and an outlet in fluid communication with the exhaust duct, and the gap is located between the nozzle of the first portion and the ejector diffusor of the second portion.

6. The exhaust system as recited in claim 5 wherein the ejector diffusor includes a diverging section of reducing diameter, a converging section of increasing diameter, and a reduced diameter section located between the diverging section and the converging section.

7. The exhaust system as recited in claim 6 wherein, during the entrain mode, an exhaust flow is drawn through the exhaust duct and through the inlet of the ejector, and a suction flow of ambient air is entrained through the passage and into the ejector diffusor by a venturi effect to combine with the exhaust flow to create a mixed flow that flows through the outlet of the second portion.

8. The exhaust system as recited in claim 7 wherein the ejector diffusor creates a venturi effect that converts pressure energy of the exhaust flow to velocity energy to create a low pressure zone that draws the suction flow into the second portion of the venturi drainage device to combine with the exhaust flow to create the mixed flow, and the mixed flow is expanded when flowing through the reduced diameter section to convert the velocity energy to the pressure energy.

9. The exhaust system as recited in claim 6 wherein, during the drain mode, the fluid drains through the passage.

10. An exhaust system of a gas turbine engine comprising:
    an exhaust duct; and
    a venturi drainage device that drains fluid collected in the exhaust duct, wherein the venturi drainage device includes a first portion including an inlet in fluid communication with the exhaust duct, a second portion including an ejector diffusor having an outlet in fluid communication with the exhaust duct, and the first portion is spaced apart from the second portion to define a gap therebetween that define a passage;
    wherein the venturi drainage device operates in an entrain mode when a flight condition occurs during operating of the gas turbine engine, and during the entrain mode, an exhaust flow is drawn through the exhaust duct and through the inlet of the venturi drainage device, and a suction flow of ambient air is entrained through a gap and into an ejector diffusor by an venturi effect to combine with the exhaust flow to create a mixed flow that flows through the outlet of the ejector diffusor of the venturi drainage device, and
    wherein the venturi drainage device operates in a drain mode when the gas turbine engine is not operating to drain the fluid from the exhaust duct.

11. The exhaust system as recited in claim 10 wherein the exhaust duct terminates in an upwardly facing opening.

12. The exhaust system as recited in claim 10 wherein the exhaust duct has a low spot, and the inlet of the venturi drainage device is located generally in the low spot of the exhaust duct.

13. The exhaust system as recited in claim 12 wherein the first portion includes the inlet and a nozzle of reduced diameter, the second portion includes an ejector diffusor and the outlet in fluid communication with the exhaust duct, and the gap is located between the nozzle of the first portion and the ejector diffusor of the second portion.

14. The exhaust system as recited in claim 13 wherein, during the entrain mode, an exhaust flow is drawn through the exhaust duct and through the inlet of the ejector, and a suction flow of ambient air is entrained through the passage and into the ejector diffusor by a venturi effect to combine with the exhaust flow to create a mixed flow that flows through the outlet of the second portion.

15. The exhaust system as recited in claim 14 wherein the ejector diffusor creates a venturi effect that converts pressure energy of the exhaust flow to velocity energy to create a low pressure zone that draws the suction flow into the second portion of the venturi drainage device to combine with the exhaust flow to create the mixed flow, and the mixed flow is expanded when flowing through the reduced diameter section to convert the velocity energy to the pressure energy.

16. The exhaust system as recited in claim 13 wherein, during the drain mode, the fluid drains through the passage.

\* \* \* \* \*

UNITED STATES PATENT AND TRADEMARK OFFICE
CERTIFICATE OF CORRECTION

PATENT NO. : 9,903,222 B2
APPLICATION NO. : 14/771253
DATED : February 27, 2018
INVENTOR(S) : Daniel T. Rog Page 1 of 1

It is certified that error appears in the above-identified patent and that said Letters Patent is hereby corrected as shown below:

In the Claims

Claim 7, Column 7, Line 17; replace "the inlet of the ejector" with --an inlet of the injector--

Claim 14, Column 8, Line 26; replace "the inlet of the ejector" with --an inlet of the injector--

Signed and Sealed this
Twenty-second Day of October, 2019

Andrei Iancu
*Director of the United States Patent and Trademark Office*